United States Patent
Kawabata

(10) Patent No.: US 11,693,389 B2
(45) Date of Patent: Jul. 4, 2023

(54) INFORMATION PROCESSING DEVICE FOR SHAPING DEVICE, SHAPING DATA COMBINING METHOD, AND SHAPING DATA COMBINING PROGRAM

(71) Applicant: MIMAKI ENGINEERING CO., LTD., Nagano (JP)

(72) Inventor: Yu Kawabata, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 18 days.

(21) Appl. No.: 16/689,093

(22) Filed: Nov. 20, 2019

(65) Prior Publication Data

US 2020/0174450 A1  Jun. 4, 2020

(30) Foreign Application Priority Data

Nov. 30, 2018  (JP) ................................. 2018-224553

(51) Int. Cl.
*G05B 19/4099* (2006.01)
*B29C 64/386* (2017.01)
*B33Y 50/00* (2015.01)

(52) U.S. Cl.
CPC ........ *G05B 19/4099* (2013.01); *B29C 64/386* (2017.08); *B33Y 50/00* (2014.12); *G05B 2219/49023* (2013.01)

(58) Field of Classification Search
CPC ........ G05B 19/4099; G05B 2219/4902; B29C 64/386; B33Y 50/00
See application file for complete search history.

(56) References Cited

U.S. PATENT DOCUMENTS

| | | | | |
|---|---|---|---|---|
| 2007/0002377 A1* | 1/2007 | Tokunaga | ............. | G06F 40/103 358/1.18 |
| 2008/0291492 A1* | 11/2008 | Miyagi | ................. | G06F 3/1285 358/1.15 |
| 2014/0081603 A1* | 3/2014 | Griffith | ................... | G06F 30/20 703/1 |
| 2015/0057784 A1* | 2/2015 | Butler | ................... | G06F 3/1288 700/119 |
| 2016/0046074 A1* | 2/2016 | Jang | ................... | G05B 19/4099 700/119 |
| 2017/0113414 A1* | 4/2017 | Zeng | .................... | G05B 19/042 |

(Continued)

FOREIGN PATENT DOCUMENTS

| | | |
|---|---|---|
| JP | 2017047538 | 3/2017 |
| JP | 2017109478 | 6/2017 |
| JP | 2018039262 | 3/2018 |

OTHER PUBLICATIONS

Office Action of Japan Counterpart Application, with English translation thereof, dated Apr. 19, 2022, pp. 1-5.

*Primary Examiner* — Thomas C Lee
*Assistant Examiner* — Michael Tang
(74) *Attorney, Agent, or Firm* — JCIPRNET

(57) ABSTRACT

A shaping data combining process of an external PC to which 3D data indicating a shaped object shaped by a 3D printer is input for each 3D job includes: a step of generating shaping data based on the 3D job, a step of combining a plurality of shaping data to generate combined shaping data to fill a margin region where the shaping of the shaped object is not performed with respect to a shapeable region of the 3D printer, and a step of transmitting the combined shaping data to the 3D printer.

8 Claims, 10 Drawing Sheets

(56) References Cited

U.S. PATENT DOCUMENTS

| | | | | |
|---|---|---|---|---|
| 2018/0133969 A1* | 5/2018 | Huang | ................. | B29C 64/386 |
| 2018/0165730 A1* | 6/2018 | Norman | ................. | G06Q 30/06 |
| 2020/0298495 A1* | 9/2020 | Manousakis | ....... | G05B 19/4099 |
| 2021/0039320 A1* | 2/2021 | Tucker | ................. | B29C 64/386 |
| 2021/0122109 A1* | 4/2021 | Sayers | ................. | B29C 64/182 |

* cited by examiner

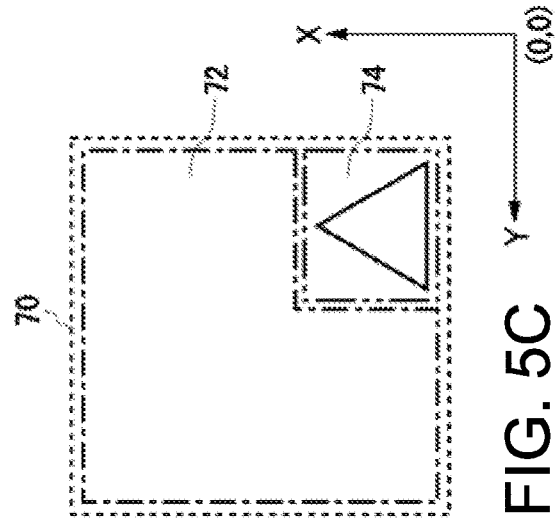
FIG. 5C
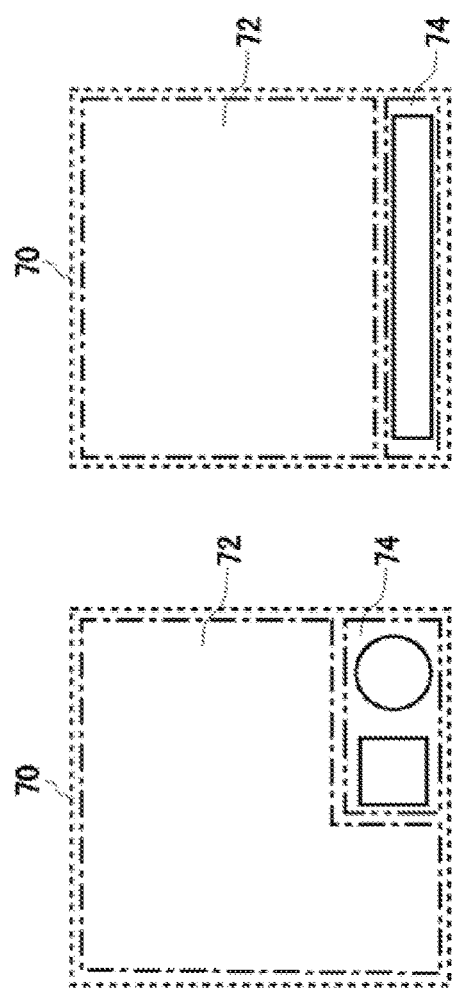
FIG. 5B
FIG. 5A
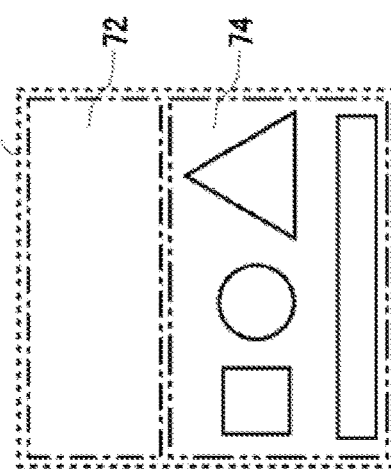
FIG. 5D

INFORMATION PROCESSING DEVICE FOR SHAPING DEVICE, SHAPING DATA COMBINING METHOD, AND SHAPING DATA COMBINING PROGRAM

CROSS REFERENCE TO RELATED APPLICATIONS

This application claims the priority benefit of Japanese Patent Application No. 2018-224553, filed on Nov. 30, 2018. The entirety of the above-mentioned patent application is hereby incorporated by reference herein and made a part of this specification.

TECHNICAL FIELD

The present disclosure relates to an information processing device for a shaping device, a shaping data combining method, and a shaping data combining program.

DESCRIPTION OF THE BACKGROUND ART

In recent years, so-called 3D printers have begun to spread, and shaping of stereoscopic shaped objects can be easily performed.

Here, Japanese Unexamined Patent Publication No. 2017-109478 (Patent Literature 1) discloses a 3D shaping system including a 3D printer that shapes a stereoscopic shaped object and a PC that transmits shaping data to the 3D printer. The PC receives the 3D data via a network, analyzes the input 3D data to convert the 3D data, and creates shaping data. Then, the 3D printer shapes a three-dimensional object based on the shaping data.

Patent Literature 1: Japanese Unexamined Patent Publication No. 2017-109478

SUMMARY

The PC as disclosed in Japanese Unexamined Patent Publication No. 2017-109478 obtains 3D data for each job and creates shaping data for each job. Here, the 3D printer may take several hours or more to shape one stereoscopic shaped object, and it takes time until one job is completed.

Furthermore, even if it is a job in which the shaped object to be shaped is small and the margin (region in which shaping of the shaped object is not performed) is large with respect to the region of the shaping table provided in the shaping device, the next job cannot be executed until one job is completed in the conventional shaping device, thus causing the job to be retained. In such a case, it is conceivable to combine a plurality of jobs with large margins into one job. However, job combining work cannot be performed by a PC as disclosed in Japanese Unexamined Patent Publication No. 2017-109478, and needs to be performed by an information processing device that transmitted the 3D data to the PC, which is return of work and is inefficient.

The present disclosure provides an information processing device for a shaping device, a shaping data combining method, and a shaping data combining program that can allow a shaped object to be shaped more efficiently with a shaping device.

An information processing device for a shaping device according to the present disclosure relates to an information processing device for a shaping device, to which a three-dimensional data indicating a shaped object shaped by the shaping device is input for each job, the information processing device including: a shaping data generator, configured to generate a shaping data based on the job; a shaping data combiner, configured to combine a plurality of the shaping data to generate a combined shaping data, so as to fill a margin region where a shaping of the shaped object is not performed with respect to a shapeable region of the shaping device; and a transmitter, configured to transmit the combined shaping data to the shaping device.

With this configuration, the information processing device for a shaping device generates shaping data based on a job including three-dimensional data indicating a shaped object, and combines a plurality of shaping data to generate combined shaping data to fill a margin region with respect to a shapeable region. The shaping device shapes a shaped object according to the combined shaping data. The retaining of the jobs is thereby suppressed since a plurality of shaping data are treated as one shaping data. Therefore, the information processing device for the shaping device according to the present disclosure can efficiently shape a shaped object by the shaping device.

In the information processing device for the shaping device according to the present disclosure, the shaping data combiner may be configured to select the shaping data capable of narrowing the margin region, and combine the plurality of shaping data to generate the combined shaping data. According to the present configuration, the shaped object can be efficiently shaped by the shaping device.

In the information processing device for the shaping device according to the present disclosure, the shaping data combiner may be configured to determine a disposition of the shaped object indicated by the combined shaping data based on a predetermined condition. According to this configuration, shaping that meets the conditions corresponding to the user's request can be performed.

In the information processing device for the shaping device according to the present disclosure, the predetermined condition may be at least one of a shaping order of the shaped object, a shaping time, and a support material used for shaping of the shaped object. According to this configuration, shaping that meets the conditions corresponding to the user's request can be performed.

In the information processing device for the shaping device according to the present disclosure, a shaping mode set to the combined shaping data may be a mode set to the shaping data that is predetermined among the plurality of shaping data to be combined. According to the present configuration, the shaping mode of the shaped object indicated by the combined shaping data is unified, whereby the shaping device can efficiently shape the shaped object.

In the information processing device for the shaping device according to the present disclosure, the shaping data combiner may be configured to divide the shaping data into a plurality of pieces, select the shaping data to fill the margin region including the shaping data divided into the plurality of pieces, and combine the plurality of shaping data to generate the combined shaping data. According to the present configuration, the shaped object can be efficiently shaped by the shaping device.

In the information processing device for the shaping device according to the present disclosure, the shaping data combiner may be configured to select the shaping data to fill the margin region including the shaping data that has been transmitted to the shaping device but has not yet been shaped, and combine the plurality of shaping data to generate the combined shaping data. According to the present configuration, the shaped object can be efficiently shaped by the shaping device.

A shaping data combining method of the present disclosure relates to a shaping data combining method for an information processing device for a shaping device, to which a three-dimensional data indicating a shaped object shaped by the shaping device is input for each job, the shaping data combining method including: a first step of generating a shaping data based on the job; a second step of combining a plurality of the shaping data to generate a combined shaping data, so as to fill a margin region where a shaping of the shaped object is not performed with respect to a shapeable region of the shaping device; and a third step of transmitting the combined shaping data to the shaping device. According to the shaping data combining method of the present disclosure, a shaping device can efficiently shape a shaped object.

A shaping data combining program of the present disclosure relates to a non-transitory computer readable medium stored with a shaping data combining program for causing a computer included in an information processing device for a shaping device, to which a three-dimensional data indicating a shaped object shaped by the shaping device is input for each job to function as: a shaping data generator that generates a shaping data based on the job; a shaping data combiner that combines a plurality of the shaping data to generate a combined shaping data, so as to fill a margin region where a shaping of the shaped object is not performed with respect to a shapeable region of the shaping device; and a transmitter that transmits the combined shaping data to the shaping device. According to the shaping data combining program of the present disclosure, a shaping device can efficiently shape a shaped object.

The information processing device for the shaping device, the shaping data combining method, and the shaping data combining program of the present disclosure have an effect that a shaped object can be efficiently shaped by a shaping device.

BRIEF DESCRIPTION OF THE DRAWINGS

FIGS. 5A to 5D are schematic views showing combined shaping data according to the first embodiment.

DESCRIPTION OF EMBODIMENTS

Hereinafter, an information processing device for a shaping device, a shaping data combining method, and a shaping data combining program according to an embodiment of the present disclosure will be described with reference to the drawings.

First Embodiment

Figure 1:
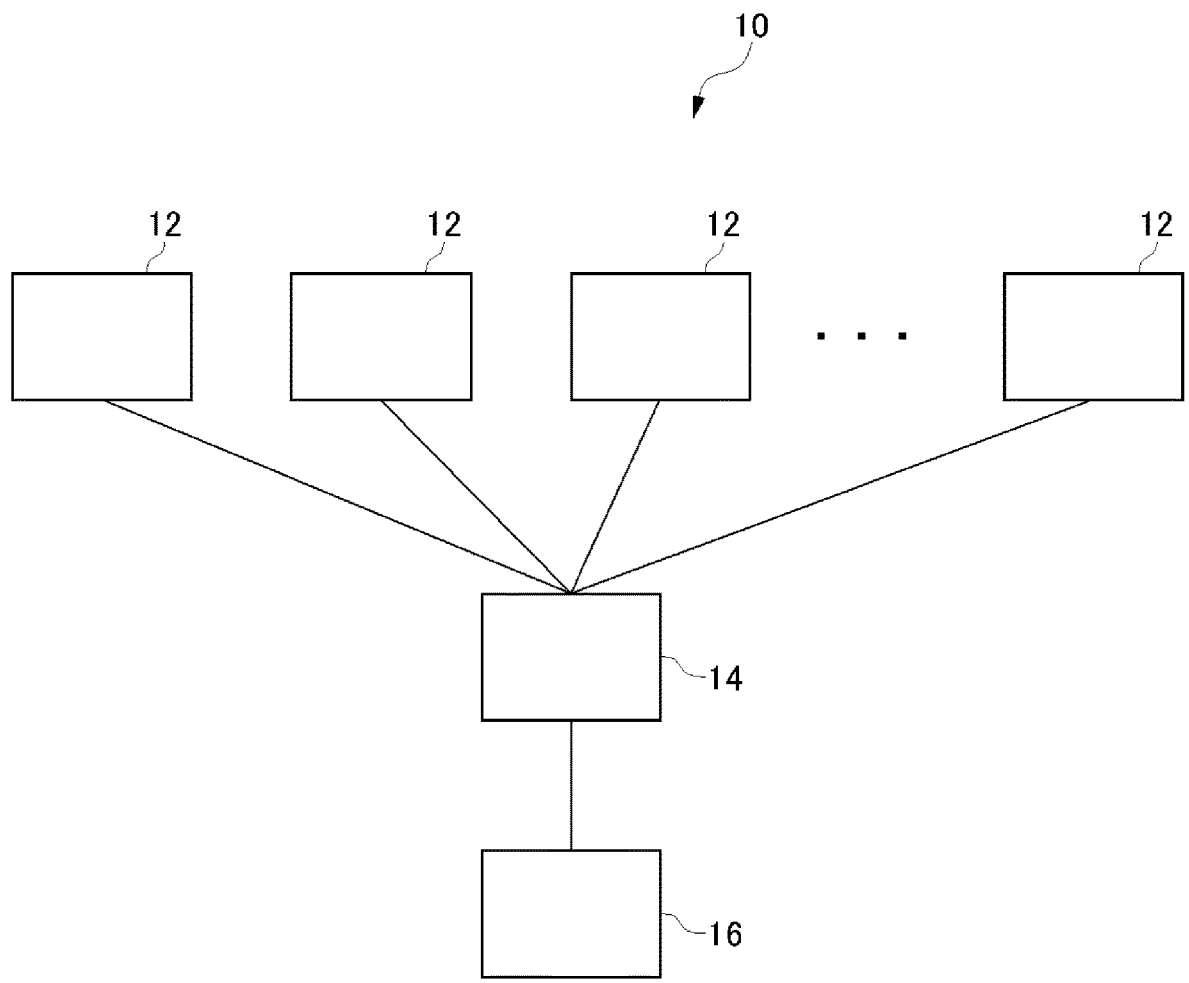
FIG. 1 is a schematic configuration view of a 3D shaping system according to a first embodiment.

A first embodiment of the present disclosure will be described. FIG. 1 is a schematic configuration view of a 3D shaping system 10 of the present embodiment. The 3D shaping system 10 is configured by a shaping preparation PC 12 which is an information processing device, an external PC 14, and a 3D printer 16. As an example, the 3D shaping system 10 of the present embodiment includes a plurality of shaping preparation PCs 12, and the external PC 14 and the 3D printer 16 are in a one-to-one relationship. Furthermore, the external PC 14 is annexed to the 3D printer 16 as an example.

The shaping preparation PC 12 transmits three-dimensional data (hereinafter referred to as "3D data") indicating a shaped object to be shaped by the 3D printer 16 to the external PC 14 for each job (hereinafter referred to as "3D job"). The 3D data is data indicating the shape of the shaped object, the surface color thereof, and the like and is created based on, for example, 3D CAD data, data of the appearance in which the shaped object to be manufactured is photographed, and the like. In addition, although the 3D data of the present embodiment are created by the information processing device different from the shaping preparation PC 12, the 3D data may be generated by the shaping preparation PC 12. Furthermore, the 3D data included in the 3D job may be not only data indicating one shaped object but may be data indicating a plurality of shaped objects.

The external PC 14 generates shaping data (hereinafter referred to as "3D shaping data") based on the input 3D job, and transmits the shaping data to the 3D printer 16. The 3D shaping data is data that defines the material, the color, and the like that form the shaped object based on the 3D data, and specifies which ink is to be ejected to which position in each layer where the shaped object is layered. The external PC 14 then determines the layout (disposing position on the shaping table) of the shaped object to be shaped by the 3D printer 16 based on the amount of ink used for shaping, the shaping time, and the like, and transmits the 3D shaping data in which the layout is determined to the 3D printer 16.

The 3D printer 16 shapes a shaped object based on the input shaping data. Furthermore, the 3D printer 16 of the present embodiment shapes a shaped object through a layered shaping method for overlapping and shaping a plurality of layers by way of an example. Moreover, as a material of a shaped object, as an example, an ultraviolet curable ink (hereinafter referred to as "UV ink") that cures when irradiated with an ultraviolet light is used.

Figure 2:
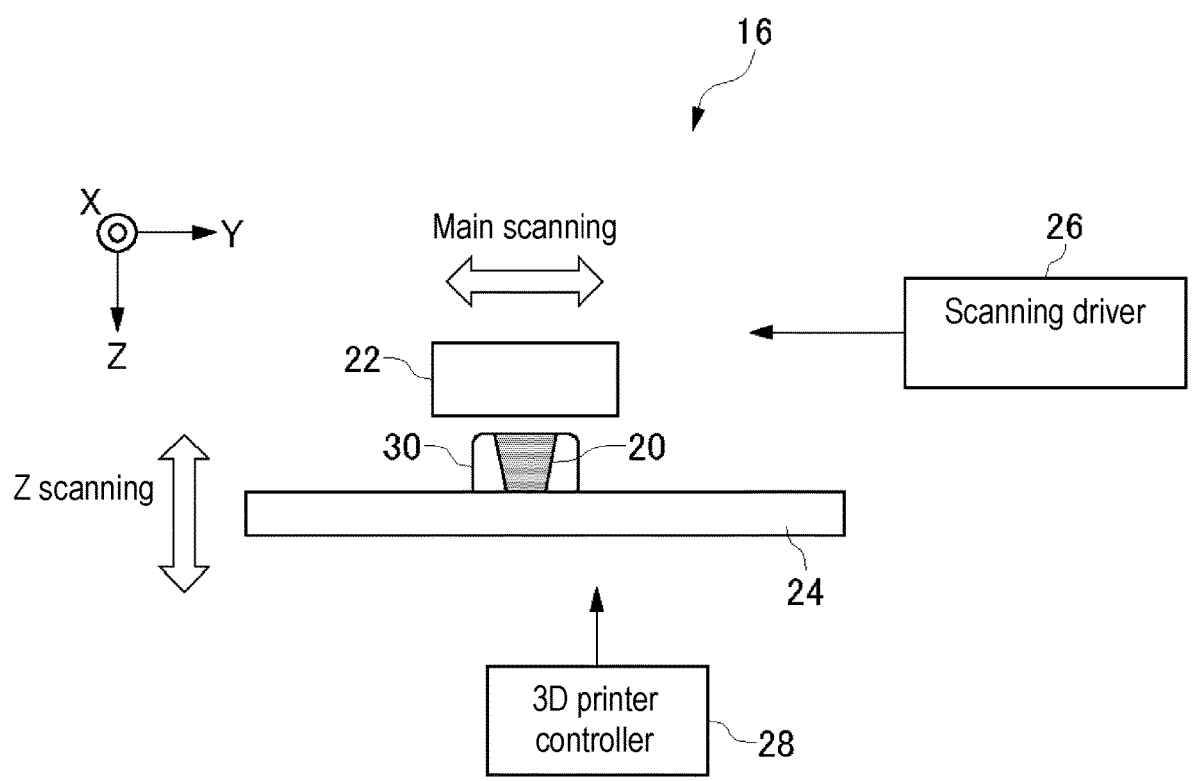
FIG. 2 is a schematic configuration view of a 3D printer according to the first embodiment.

The configuration of the 3D printer 16 will be described with reference to FIG. 2. As shown in FIG. 2, the 3D printer 16 includes a head portion 22, a shaping table 24, a scanning driver 26, and a 3D printer controller 28.

The head portion 22 ejects UV ink to become the material of the shaped object 20 as droplets. The head portion 22 includes a plurality of inkjet heads corresponding to the respective colors (cyan (C), magenta (M), yellow (Y), black (K), etc.), an ultraviolet light source for curing UV ink, a flattening roller for flattening the upper surface of each layer, and the like. Furthermore, the head portion 22 ejects a support material for forming a support layer 30 around the shaped object 20. The support layer 30 is, for example, a layered structural object that supports the shaped object 20 by surrounding the outer periphery of the shaped object 20 being shaped. The support layer 30 is shaped as necessary at the time of shaping of the shaped object 20 and removed after the completion of the shaping.

The shaping table 24 is a planar member on which the shaped object 20 being shaped is placed, and is disposed at a position facing the UV ink ejection port of the inkjet head included in the head portion 22. Furthermore, at least the upper surface of the shaping table 24 is movable in the layering direction, and the upper surface moves in accordance with the progress of shaping of the shaped object 20 by being driven by the scanning driver 26. The layering direction of the present embodiment is a direction (Z direction in the drawing) orthogonal to the main scanning direction (Y direction in the drawing) and the sub scanning direction (X direction in the drawing) set in advance in the 3D printer 16.

The scanning driver 26 is a driver that moves the head portion 22 relative to the shaped object 20 (hereinafter, referred to as "scanning"). The scanning driver 26 causes the head portion 22 to perform a main scan (Y scan), a sub scan (X scan), and a layering direction scanning (Z scan) as the scanning. Here, the main scan is an operation of ejecting the ink from the head portion 22 while moving the head portion 22 in the main scanning direction (Y direction).

The 3D printer controller 28 is, for example, a central processing unit (CPU) of the 3D printer 16, and controls each portion of the 3D printer 16 to control the shaping operation of the shaped object 20. That is, the 3D printer controller 28 controls each portion of the 3D printer 16 based on the 3D shaping data input from the external PC 14 to overlap and cure the UV ink in the layering direction and shape the shaped object 20.

Figure 3:
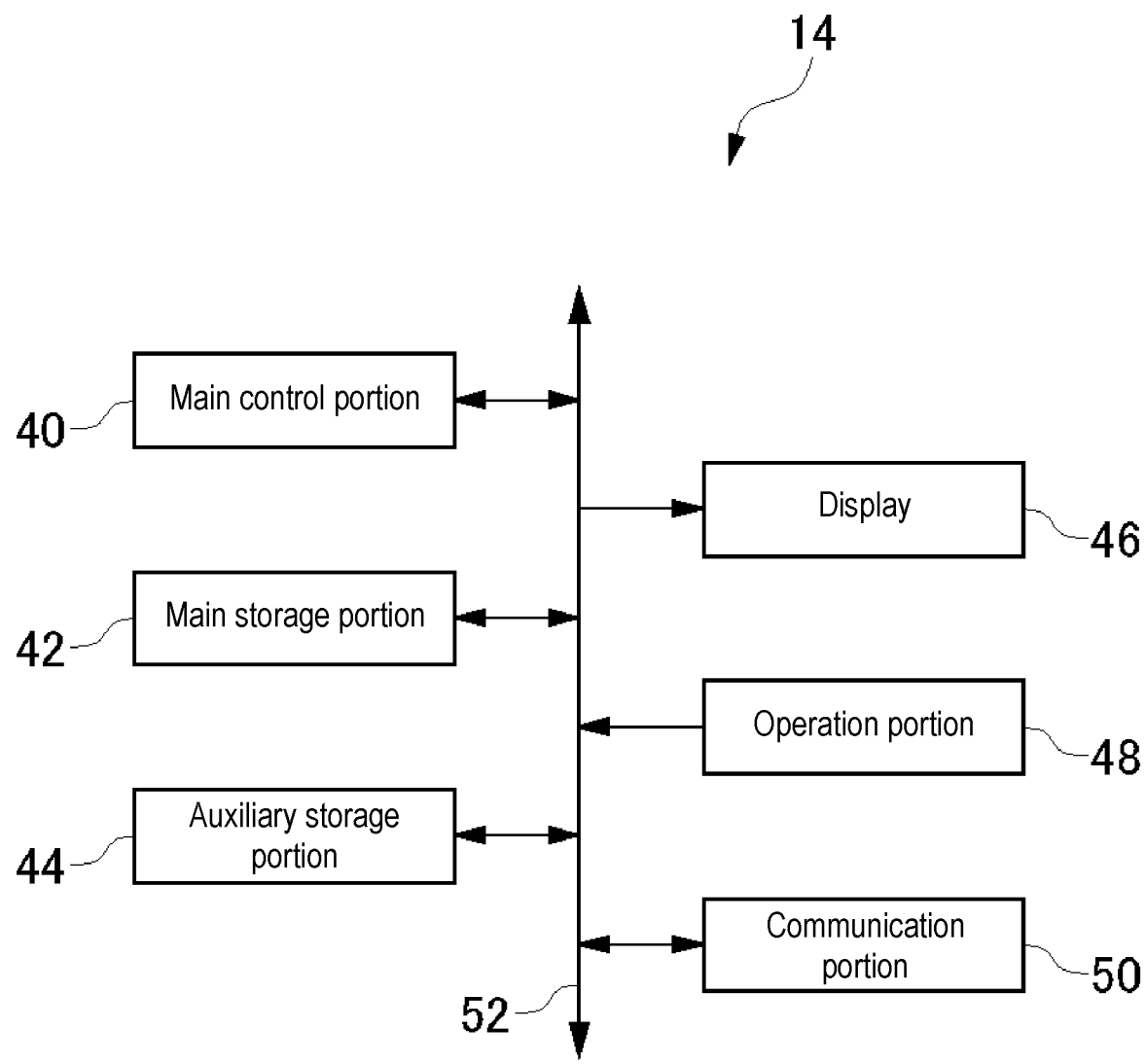
FIG. 3 is a block diagram showing an electrical configuration of an external PC according to the first embodiment.

FIG. 3 is a block diagram showing an electrical configuration of the external PC 14. The external PC 14 includes a main control portion 40, a main storage portion 42, an auxiliary storage portion 44, a display 46, an operation portion 48, and a communication portion 50.

The main control portion 40 is, for example, a CPU, and controls the operation of the external PC 14.

The main storage portion 42 is, for example, a random access memory (RAM) or a dynamic random access memory (DRAM), and is used as a work area at the time of execution of processing based on various programs by the main control portion 40, a storage area for temporarily storing data, and the like. The auxiliary storage portion 44 is, for example, a non-volatile memory such as a flash memory or a hard disk drive (HDD), and stores various data, programs used for processing of the main control portion 40, and the like. The programs stored in the auxiliary storage portion 44 are, for example, an operating system (OS) of the external PC 14, a driver for controlling various hardware, and the like.

The display 46 is, for example, a liquid crystal display (LCD) or the like, and displays an image based on processing by the main control portion 40. The operation portion 48 performs various input operations to the external PC 14 and is, for example, a touch panel, a keyboard, a mouse, a touch pad, a button, or the like. The display 46 and the operation portion 48 may be shared with the display and the operation portion of the 3D printer 16.

The communication portion 50 has a function of transmitting and receiving data to and from the shaping preparation PC 12, the 3D printer 16, and other information processing devices. That is, the communication portion 50 receives 3D data from the shaping preparation PC 12 and transmits 3D shaping data to the 3D printer 16.

The main control portion 40, the main storage portion 42, the auxiliary storage portion 44, the display 46, the operation portion 48, and the communication portion 50 are electrically connected to one another via a system bus 52. Therefore, the main control portion 40 can access the main storage portion 42 and the auxiliary storage portion 44, display an image on the display 46, grasp the operation state with respect to the operation portion 48, and access the shaping preparation PC 12, the 3D printer 16, and other information processing devices through the communication portion 50.

Figure 4:
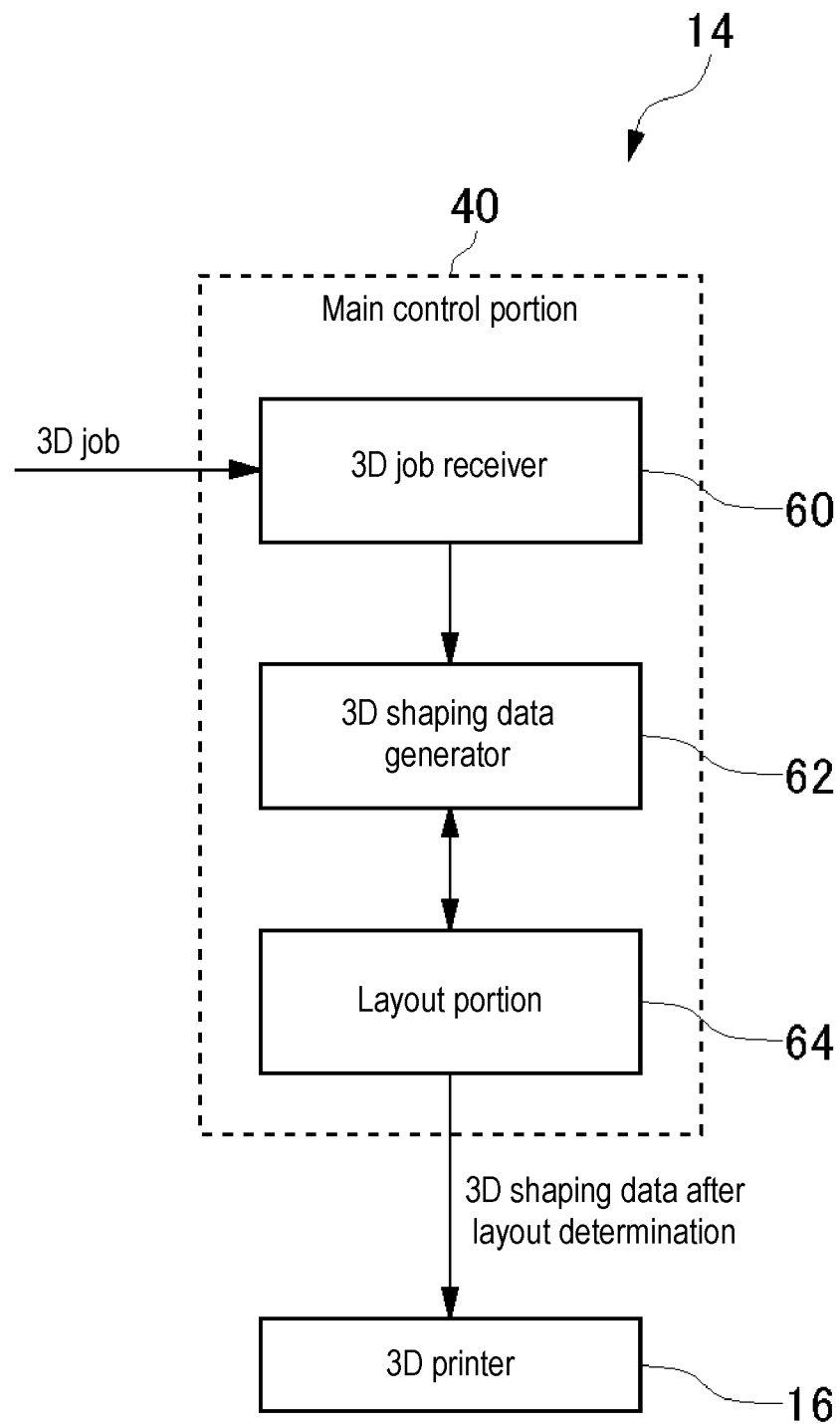
FIG. 4 is a functional block diagram related to generation of 3D shaping data according to the first embodiment.

FIG. 4 is a functional block diagram regarding generation of 3D shaping data of the external PC 14. The main control portion 40 of the external PC 14 includes a 3D job receiver 60, a 3D shaping data generator 62, and a layout portion 64. Each function of the main control portion 40 is realized by a program stored in the auxiliary storage portion 44.

The 3D job receiver 60 receives a 3D job received from the shaping preparation PC 12 through the communication portion 50, and stores the 3D job in the main storage portion 42 as an example.

The 3D shaping data generator 62 generates 3D shaping data based on the 3D job, and outputs the same to a layout portion 64. The 3D shaping data generator 62 temporarily stores the 3D shaping data in the main storage portion 42 when the amount of input 3D data is large and the layout portion 64 does not receive an input of the generated 3D shaping data.

The layout portion 64 determines the disposition of the shaped object 20 to be shaped on the shaping table 24 of the 3D printer 16 based on the 3D shaping data. Then, the 3D shaping data in which the layout is determined is transmitted to the 3D printer 16 through the communication portion 50. That is, the layout portion 64 calculates the amount of ink, shaping time, and the like used for shaping of the shaped object 20 based on the 3D shaping data. Then, the layout portion 64 determines the disposition (hereinafter referred to as "layout") of the shaped object 20 on the shaping table 24 so that the amount of ink used becomes lesser and the shaping time becomes shorter. The amount of ink used also includes the amount of support material. Thus, the layout portion 64 also determines the orientation of the shaped object 20 at the time of shaping as the layout so that the amount of the support material is reduced.

The external PC 14 of the present embodiment has a shaping data combining function. The shaping data combining function is a function of combining a plurality of 3D shaping data to generate combined shaping data, so as to fill a margin region where shaping of the shaped object 20 is not performed with respect to the shapeable region of the 3D printer 16. In addition, a shapeable region is, in other words, a maximum region where the shaped object 20 can be shaped on the shaping table 24 of the 3D printer 16. The margin region is a region where the shaped object 20 is not shaped with respect to the shapeable region. Furthermore, the region in which the margin region is eliminated from the shapeable region is a shaping region where the shaping of the shaped object 20 is carried out.

The shaping data combining function of the present embodiment is mainly executed by the layout portion 64. Thus, as an example, the layout portion 64 calculates the size of the margin region and the shaping region based on the 3D shaping data in which the layout is determined. Then, when the size of the margin region is greater than or equal to a predetermined value with respect to the shapeable region, a plurality of 3D shaping data are combined to generate combined shaping data to fill the margin region.

More specifically, when the margin region of 3D shaping data after layout determination is greater than or equal to a predetermined value (e.g., 10% or more), the layout portion 64 inquires the 3D shaping data generator 62 whether other 3D shaping data is stored in the main storage portion 42. That is, the other 3D shaping data is a 3D job that is retained without yet being output to the layout portion 64. Then, when other 3D shaping data is present, the layout portion 64 determines a margin region or a shaping region of the other 3D shaping data. Then, the layout portion 64 selects another 3D shaping data that can fill the margin region by being combined with the previously input 3D shaping data, combines it with the previous 3D shaping data to generate combined shaping data, and transmits it to the 3D printer 16. Since a plurality of 3D shaping data are treated as one 3D shaping data, retaining of 3D jobs is suppressed. Therefore, the external PC 14 can efficiently shape the shaped object 20 with the 3D printer 16.

Note that "filling the margin region" refers to combining the shaping regions of other 3D shaping data so that the margin region of the 3D shaping data previously input to the layout portion 64 becomes smaller, and the sum of the shaping region of the previous 3D shaping data and the shaping region of the other 3D shaping data does not exceed 100%.

The shaping data combining function will be described with reference to FIGS. 5A to 5D. FIGS. 5A to 5D are schematic views of the 3D shaping data, and correspond to top views (xy plan views) in a case where the shaped object 20 is shaped on the shaping table 24. In FIGS. 5A to 5D, a solid line indicates data corresponding to the shaped object 20, a broken line indicates the shapeable region 70, a one dot chain line indicates the margin region 72, and a two-dot chain line indicates the shaping region 74. As shown in FIGS. 5A to 5D, the margin region 72 is formed to a rectangular shape defined separated from the shaped object 20 by greater than or equal to a predetermined length by way of example, and similarly, the shaping region 74 is formed to a rectangular shape defined to surround separated from the shaped object 20 by greater than or equal to a constant length, but this is not the sole case, and a method if defining the margin region 72 and the shaping region 74 may be other methods.

Furthermore, in FIGS. 5A to 5D, the peripheries of the shapeable region 70, the margin region 72 and the shaping region 74 are spaced apart, but they are spaced apart for convenience so that the respective regions can be clearly distinguished in the drawing. Actually, the peripheries of the shapeable region 70, the margin region 72, and the shaping region 74 are in contact with each other, and the sum of the margin region 72 and the shaping region 74 becomes the shapeable region 70. In the example of FIGS. 5A to 5D, the 3D printer 16 shapes the shaped object 20 by performing a scanning operation with the head portion 22 with (X, Y)=(0, 0) as the origin point.

The 3D shaping data shown in FIG. 5A is the 3D shaping data previously input to the layout portion 64, and the margin region 72 is 80% of the shapeable region 70 and is wider than the predetermined value (10%). Thus, the layout portion 64 determines the margin region 72 (shaping region 74) of the other 3D shaping data when other 3D shaping data is present. FIGS. 5B and 5C are other 3D shaping data determined as being combinable with the 3D shaping data of FIG. 5A, and each margin region 72 is 80%, in other words, the shaping region 74 is 20%. Thus, the 3D shaping data in FIGS. 5B and 5C can fill the margin region 72 of the 3D shaping data in FIG. 5A by being combined with the 3D shaping data in FIG. 5A. The combined shaping data generated in this manner is shown in FIG. 5D, and the margin region 72 is 40%.

Furthermore, the layout portion 64 selects the 3D shaping data capable of narrowing the margin region 72, and generates combined shaping data. For example, as other 3D shaping data to be combined with the 3D shaping data in which the margin region 72 is 80%, if 3D shaping data A in which the margin region 72 is 30% (shaping region 74 is 70%) and 3D shaping data B in which the margin region 72 is 50% (shaping region 74 is 50%) are present, the 3D shaping data A in which the margin region 72 is narrower, in other words, the shaping region 74 is wider is selected.

Furthermore, the layout portion 64 of the present embodiment determines the layout of the plurality of shaped objects 20 indicated by the combined shaping data based on a predetermined condition (hereinafter referred to as "layout determination condition"). The layout determination condition is, for example, at least one of the shaping order of the shaped object 20, the shaping time, and the amount of support material used for the shaping of the shaped object 20. The shaping time is the time required to shape all the plurality of shaped objects 20 indicated by the combined shaping data. This enables shaping that meets the conditions corresponding to the user's request. The layout determination condition is selected by the user as an example. The layout determination condition is not limited to the above conditions, and may include other conditions.

Figure 6A:
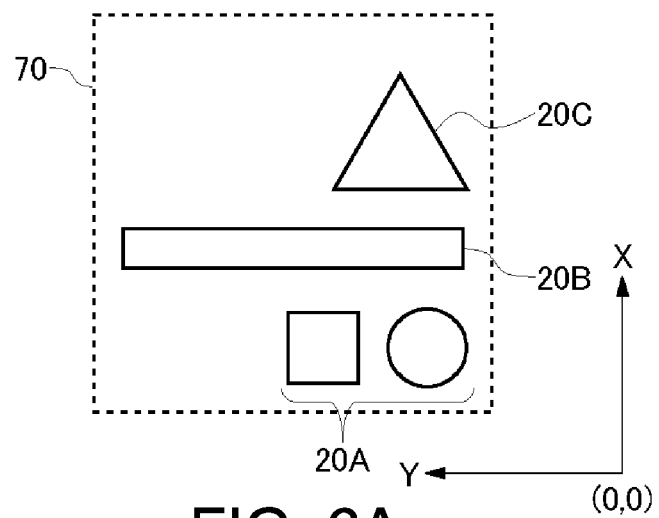
FIGS. 6A to 6C are schematic views showing a layout example of the combined shaping data according to the first embodiment.
Figure 6B:
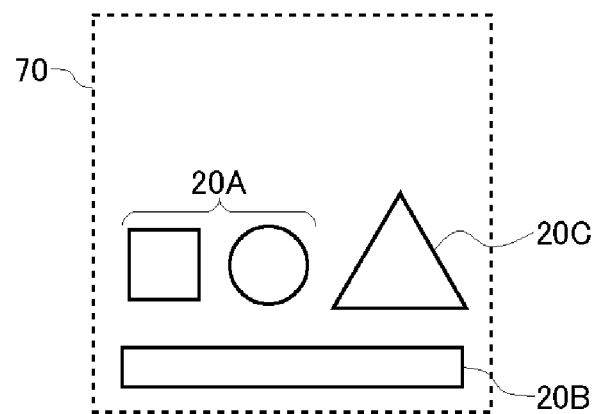
Figure 6C:
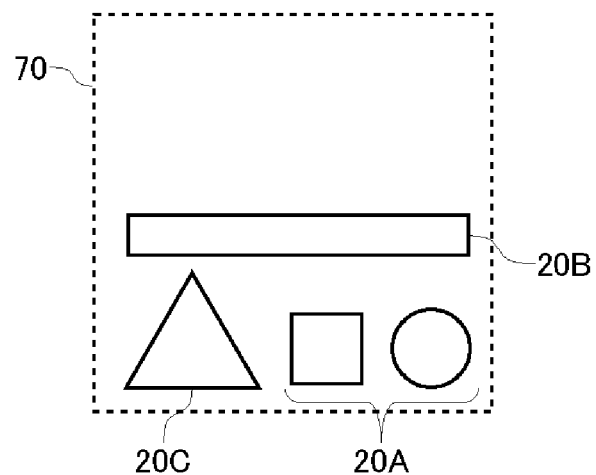

FIGS. 6A to 6C are schematic views for a case where the shaping order of the shaped object 20 is adopted as the layout determination condition. The shaped object 20A shown in FIGS. 6A to 6C corresponds to the shaped object 20 in FIG. 5A, the shaped object 20B corresponds to the shaped object 20 in FIG. 5B, and the shaped object 20C corresponds to the shaped object in FIG. 5C. As described above, the 3D printer 16 shapes the shaped object 20 by scanning the head portion 22 with (X, Y)=(0, 0) as the origin point. Therefore, in the layout of the shaped object 20 shown in FIG. 6A, the shaping is performed in the order of the shaped object 20A, the shaped object 20B, and the shaped object 20C. Furthermore, in the example of FIG. 6B, the shaping is performed in the order of the shaped object 20B, the shaped object 20C, and the shaped object 20A, and in the example of FIG. 6C, the shaping is performed in the order of the shaped object 20A, the shaped object 20C, and the shaped object 20B.

Furthermore, when determining the layout based on the shaping time, as an example, the layout portion 64 derives a plurality of assumed layouts, calculates the shaping time for each layout, presents the layout having the shortest shaping time to the user, and causes the user to select a layout. In the example of FIGS. 6A to 6C, while the layout of FIG. 6A in which the movement of the head portion 22 in the X direction is the largest has the longest shaping time, the shaping time of FIGS. 6B and 6C is the same and hence the layout of FIG. 6B or FIG. 6C is presented to the user as a layout having a short shaping time. Moreover, the layout portion 64 may change the orientation in which the shaped object 20 is shaped in order to shorten the shaping time. For example, in the 3D shaping data for shaping the shaped object 20 that is vertically long in the Z direction, the amount of movement of the head portion 22 in the Z direction becomes long and thus the shaping time may become long. In such a case, the layout portion 64 may reduce the amount of movement in the Z direction and reduce the shaping time by laying out the shaped object 20 to be laid in the X direction or the Y direction.

Furthermore, when determining the layout by the amount of support material used for the shaping of the shaped object 20, the layout portion 64 derives a plurality of assumed layouts, calculates the amount of support material for each layout, presents the layout having small amount of support material to the user, and causes the user to select a layout.

Moreover, the shaping mode set in the combined shaping data is a shaping mode set for predetermined 3D shaping data among the plurality of 3D shaping data to be combined. The shaping mode is an operation mode of the 3D printer 16 when shaping the shaped object 20, and for example, includes a short time shaping mode in which the shaping accuracy is low but the shaping time is short and a high accuracy shaping mode in which the shaping accuracy is high but the shaping time is long. The predetermined 3D shaping data is, for example, 3D shaping data in which the shaping is completed first, and 3D shaping data specified by the user. That is, when the shaping mode set in the 3D shaping data in which the shaping is completed first is the short time shaping mode, the shaping mode of the combined shaping data is set to the short-time shaping mode. Thus, the shaping mode of the shaped object 20 indicated by the combined shaping data is unified, whereby the 3D printer 16 can efficiently shape the shaped object.

Figure 7:
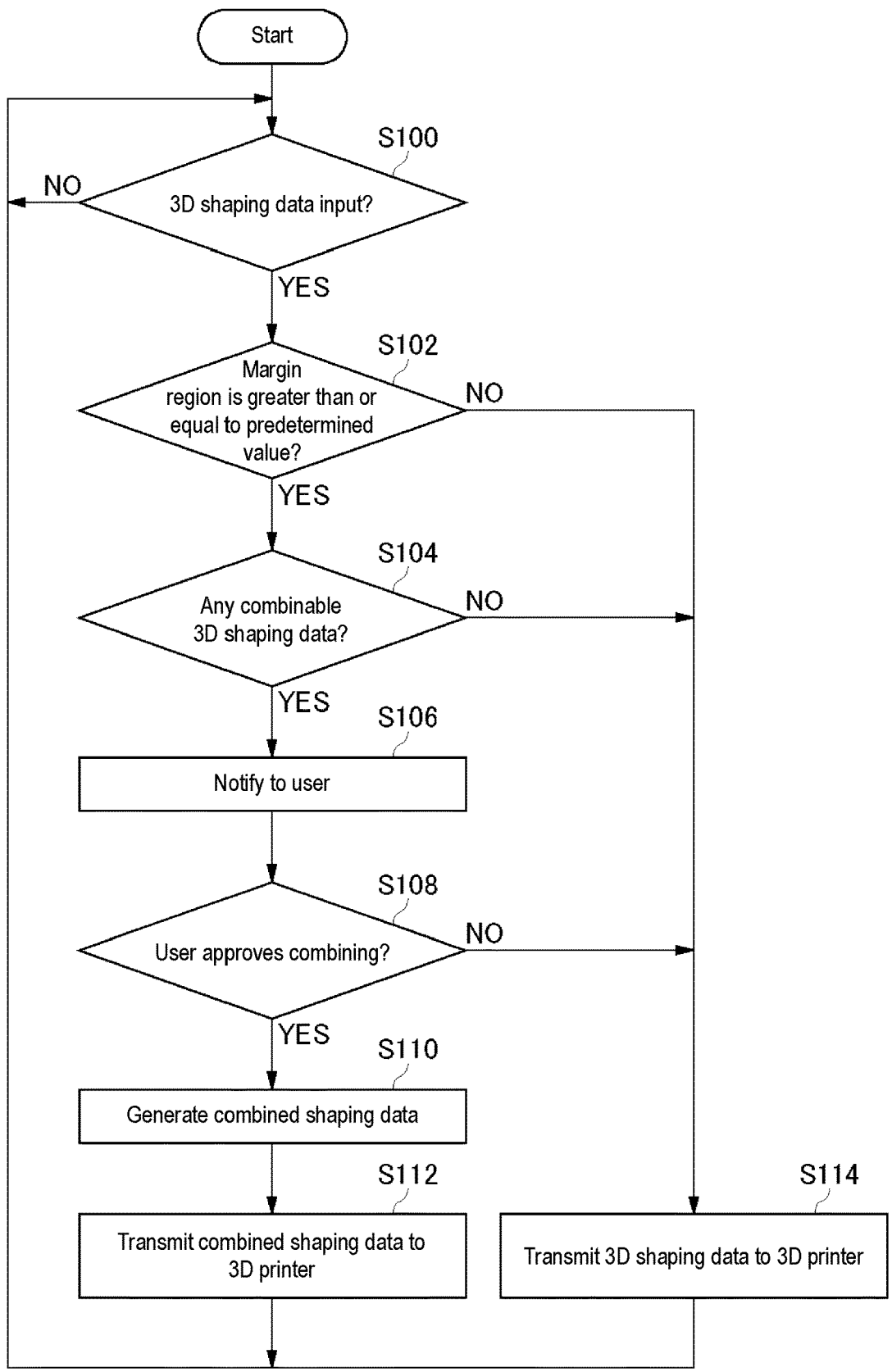
FIG. 7 is a flowchart showing a flow of shaping data combining processing according to the first embodiment.

FIG. 7 is a flowchart showing the flow of the shaping data combining processing performed by the layout portion 64.

First, in step S100, whether the 3D shaping data is input is determined, where the process proceeds to step S102 if positive determination is made and the process enters in a standby state until the 3D shaping data is input if negative determination is made.

In step S102, whether the margin region 72 included in the input 3D shaping data is greater than or equal to a predetermined value is determined, where the process proceeds to step S104 if positive determination is made and the process proceeds to step S114 if negative determination is made.

In step S104, whether other 3D shaping data that can be combined is present is determined, where the process proceeds to step S106 if positive determination is made and the process proceeds to step S114 if negative determination is made.

In step S106, the user is notified that the 3D shaping data can be combined. This notification may be made to, for example, the display of the external PC 14 or the 3D printer 16 or the shaping preparation PC 12 that transmitted the 3D data which is the source of the 3D shaping data, or the notification may be made by transmitting a message to a predetermined e-mail address. Furthermore, this notification also aims to obtain approval of combining the 3D shaping data from the user.

In the next step S108, presence or absence of the approval of combination by the user is determined, where the process proceeds to step S110 if positive determination is made and the process proceeds to step S114 if negative determination is made. When the user approves the combination, the user also inputs layout determination conditions.

In step S110, the 3D shaping data input in step S100 and the 3D shaping data determined (selected) in step S104 are combined to generate combined shaping data. In step S110, the layout of the combined shaping data is also determined in accordance with the input layout determination condition.

In the next step S112, the combined shaping data in which the layout is determined is transmitted to the 3D printer 16 through the communication portion 50, and the process returns to step S100.

On the other hand, in step S114, to which the process proceeds when negative determination is made in steps S102, S104, and S108, the 3D shaping data input to the layout portion 64 in step S100 is transmitted to the 3D printer 16 through the communication portion 50 without generating combined shaping data, and the process returns to step S100.

Furthermore, the layout portion 64 has a dividing function of dividing the 3D shaping data into a plurality of 3D shaping data. The dividing function functions when the shaped object 20 can be divided into a plurality of pieces and shaped. For example, when the shaped object 20 indicated by the 3D shaping data is too large and cannot be placed on the shaping table 24, that is, when the size of the shaped object 20 to be shaped exceeds the shapeable region 70, the layout portion 64 divides the 3D shaping data into a plurality of shaping data, and transmits the same to the 3D printer 16. Whether the 3D shaping data is dividable may be determined, for example, by analyzing the 3D shaping data by the layout portion 64, or may be determined by setting the dividable parts in advance when creating the 3D data.

Then, the shaping data combining function of the layout portion 64 divides the 3D shaping data set to be dividable into a plurality of pieces, selects the 3D shaping data that fills the margin region 72 including the 3D shaping data divided into the plurality of pieces, and combines the plurality of 3D shaping data to generate the combined shaping data. More specifically, 3D shaping data including the margin region 72 of greater than or equal to a predetermined value is input to the layout portion 64, and the 3D shaping data is divided when the other retained 3D shaping data includes the dividable 3D shaping data. The shaping data combining function selects the 3D shaping data to be combined with the 3D shaping data input to the layout portion 64 from among the plurality of 3D shaping data including the divided 3D shaping data, and generates the combined shaping data. Thus, the shaping data combining function can efficiently shape the shaped object 20 by the 3D printer 16.

In the case where the layout portion 64 lays out the 3D shaping data to be transmitted to the 3D printer 16 last among the plurality of divided 3D shaping data, other 3D shaping data may be combined to fill the margin region 72 of the 3D shaping data.

Furthermore, the layout portion 64 may select the 3D shaping data to fill the margin region 72 including the 3D shaping data that has been transmitted to the 3D printer 16 but has not yet been shaped, and combine a plurality of 3D shaping data to generate the combined shaping data. Thus, the shaping data combining function can efficiently shape the shaped object 20 by the 3D printer 16.

More specifically, since the 3D printer 16 processes the 3D shaping data one by one, the 3D shaping data that has been transmitted but has not yet been processed may be stored in the 3D printer 16. Therefore, when the 3D shaping data input to the layout portion 64 has a margin region 72 greater than or equal to a predetermined value, the layout portion 64 reads out the 3D shaping data that has been transmitted to the 3D printer 16 but has not yet been shaped from the 3D printer 16, determines whether the data can be combined, and generates the combined shaping data if data can be combined.

In a case where the 3D shaping data transmitted to the 3D printer 16 is combined to generate the combined shaping data, the layout portion 64 determines the layout so that the shaped object 20 indicated by the transmitted 3D shaping data is shaped first.

Second Embodiment

Hereinafter, a second embodiment of the present disclosure will be described. The parts of the configuration of the second embodiment that are the same as the configuration of the first embodiment are denoted with the same reference numerals, and descriptions thereof will be omitted.

Figure 8:
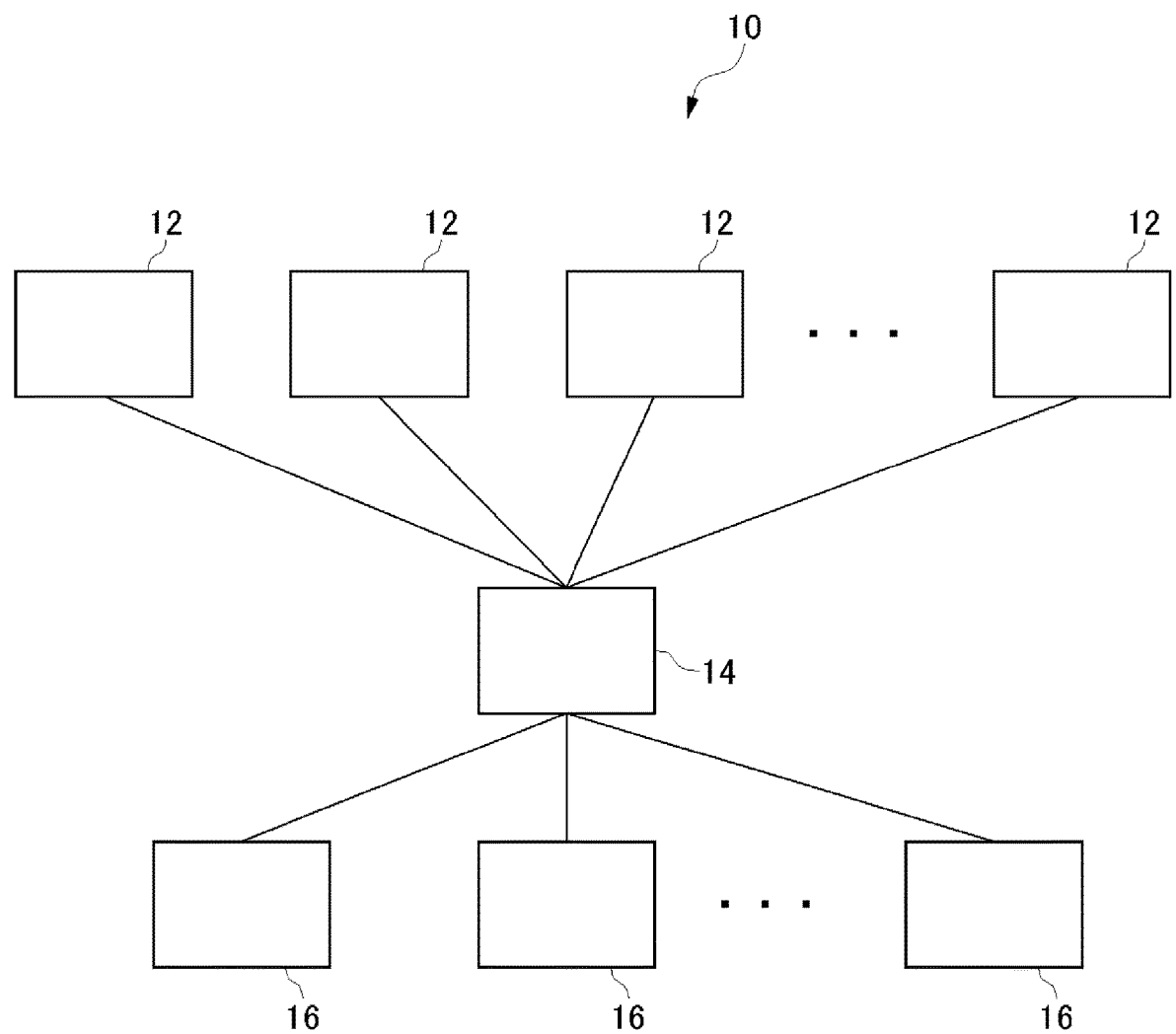
FIG. 8 is a schematic configuration view of a 3D shaping system according to a second embodiment.

FIG. 8 shows a configuration of a 3D shaping system 10 of the present embodiment. In the 3D shaping system 10 of the present embodiment shown in FIG. 8, one external PC 14 and a plurality of 3D printers 16 are data communicably connected.

Figure 9:
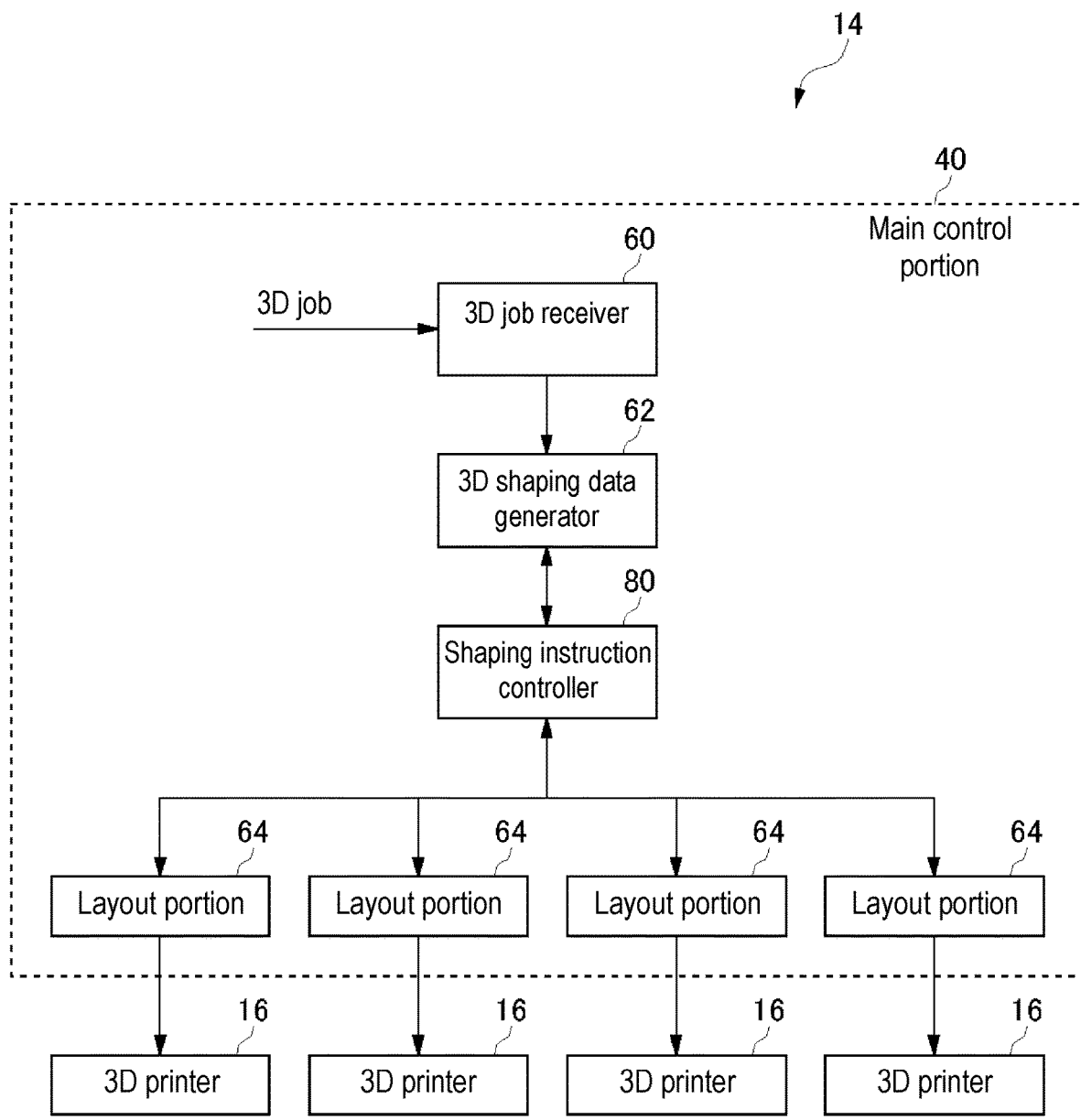
FIG. 9 is a functional block diagram related to the shaping data combining function according to the second embodiment.

FIG. 9 is a functional block diagram related to the shaping data combining function of the present embodiment. The main control portion 40 includes a shaping instruction controller 80 in addition to the 3D job receiver 60, the 3D shaping data generator 62, and the layout portion 64. Furthermore, the layout portion 64 is provided in correspondence with each 3D printer 16.

The shaping instruction controller 80 grasps, as 3D printer information, the capability of each 3D printer 16 provided in the 3D shaping system 10, the operating state, the remaining amount of ink, and the like. The capability of the 3D printer 16 is, for example, the layering pitch interval, reproducible colors, and the like, and the operating state is whether each 3D printer 16 is in operation, the number of 3D shaping data transmitted to the 3D printer, its shaping time, and the like. The shaping instruction controller 80 selects the suitable 3D printer 16 for each 3D shaping data based on the 3D printer information, and outputs the 3D shaping data to the layout portion 64 corresponding to the selected 3D printer 16. For example, when the 3D shaping data requires a shaping function of high resolution, the shaping instruction controller 80 outputs the 3D shaping data to the layout portion 64 corresponding to the 3D printer 16 having a small layering pitch interval. Furthermore, for example, the shaping instruction controller 80 preferentially outputs 3D shaping data to the layout portion 64 corresponding to the 3D printer 16 not in operation.

When the input 3D shaping data includes a margin region 72 greater than or equal to a predetermined value, the layout portion 64 of the present embodiment inquires the presence or absence of other 3D shaping data to the 3D shaping data generator 62 through the shaping instruction controller 80. When other 3D shaping data that can be shaped by the corresponding 3D printer 16 is present, the layout portion 64 combines the other 3D shaping data to fill the margin region 72 of the previously input 3D shaping data to generate the combined shaping data.

Third Embodiment

Hereinafter, a third embodiment of the present disclosure will be described. Similar to the second embodiment, in the 3D shaping system 10 of the present embodiment, one external PC 14 and a plurality of 3D printers 16 are data communicably connected. The parts of the configuration of the third embodiment that are the same as the configurations of the first embodiment and the second embodiment are denoted with the same reference numerals, and descriptions thereof will be omitted.

Figure 10:
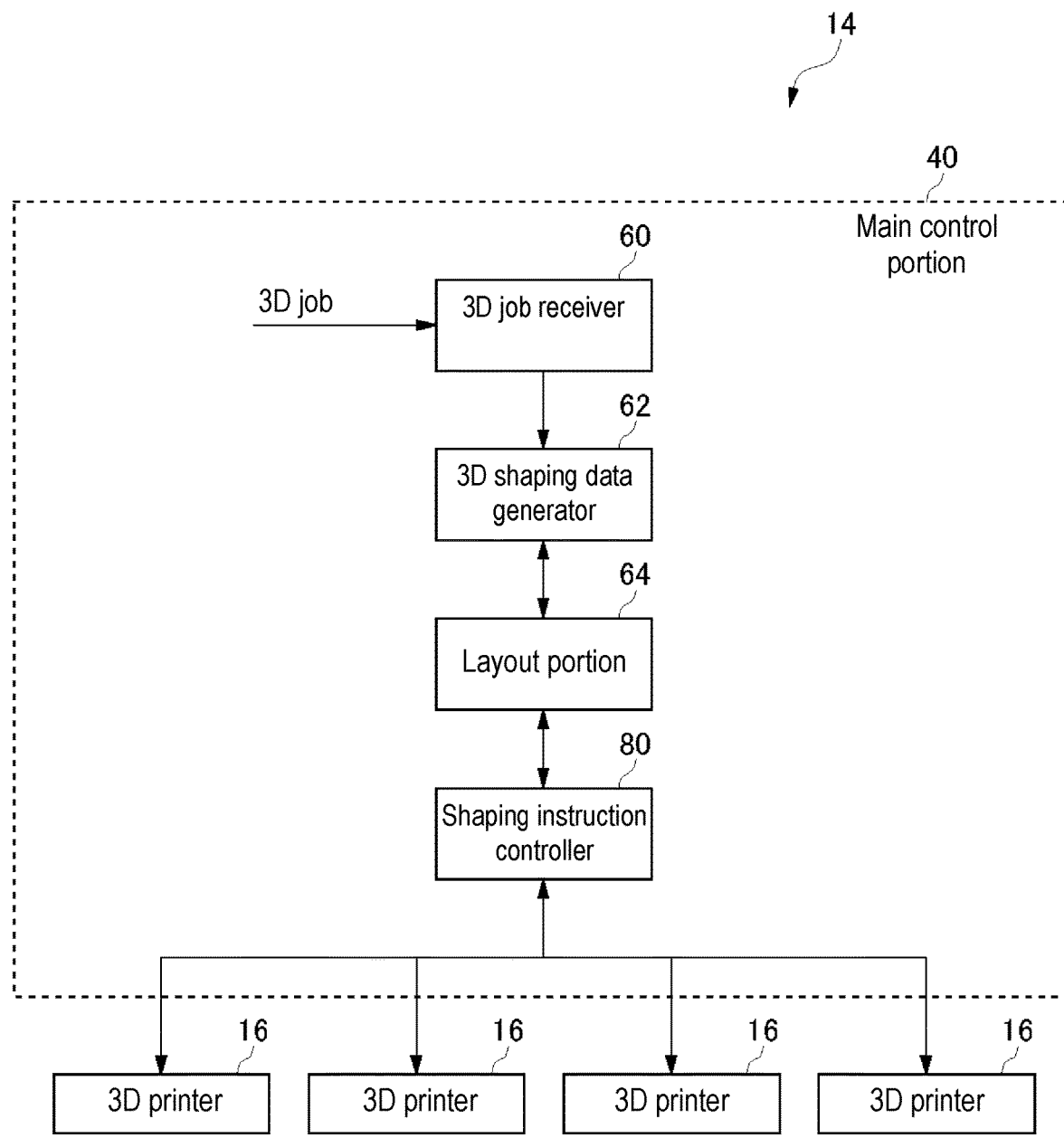
FIG. 10 is a functional block diagram related to a shaping data combining function according to a third embodiment.

FIG. 10 is a functional block diagram related to the shaping data combining function of the present embodiment. The main control portion 40 includes a 3D job receiver 60, a 3D shaping data generator 62, a layout portion 64, and a shaping instruction controller 80. Furthermore, one layout portion 64 is provided with respect to the plurality of 3D printers 16, and transmits 3D shaping data to the 3D printer 16 through the shaping instruction controller 80.

The layout portion 64 determines the layout based on the amount of ink used and the shaping time with respect to the 3D shaping data input from the 3D shaping data generator 62, and outputs the layout to the shaping instruction controller 80. The shaping instruction controller 80 selects the 3D printer 16 suitable for the input 3D shaping data, and transmits the 3D shaping data to the selected 3D printer 16.

When the 3D shaping data to be transmitted to the suitable 3D printer 16 includes the margin region 72 of greater than or equal to a predetermined value, the shaping instruction controller 80 sends a layout change request to the layout portion 64. When the layout change request is received, the layout portion 64 determines the presence or absence of other 3D shaping data that can be combined with the 3D shaping data, creates combined shaping data when other 3D shaping data that can be combined is present, and outputs the same to the shaping instruction controller 80. The shaping instruction controller 80 transmits the combined shaping data to a suitable 3D printer 16.

As described above, the disclosure has been described using each embodiment above, but the technical scope of the present disclosure is not limited to the scope described in each embodiment above. Various changes or improvements can be added to the embodiments described above without departing from the scope of the disclosure, and a mode in which changes or improvements are added is also encompassed within the technical scope of the present disclosure. Each embodiment described above may be appropriately combined.

Furthermore, the flow of the process described in each of the above embodiments is an example, and unnecessary steps may be deleted, new steps may be added, or the process order may be interchanged within a scope not deviating from the gist of the present disclosure.

Effects of the Embodiments (1) An external PC 14 of the present embodiment is an external PC 14 to which 3D data indicating a shaped object 20 shaped by the 3D printer 16 is input for each 3D job, and includes a 3D shaping data generator 62 that generates the shaping data based on the 3D job, a layout portion 64 that combines a plurality of shaping data to generate combined shaping data to fill the margin region 72 where the shaping of the shaped object 20 is not performed with respect to the shapeable region 70 of the 3D printer 16, and a communication portion 50 that transmits the combined shaping data to the 3D printer 16.

With this configuration, the external PC 14 generates shaping data based on the 3D job including the 3D data indicating the shaped object 20, and combines a plurality of shaping data to generate the combined shaping data to fill the margin region 72 with respect to the shapeable region 70. Then, the 3D printer 16 shapes the shaped object 20 according to the combined shaping data. The retaining of the 3D jobs is thereby suppressed since a plurality of shaping data are treated as one shaping data. Therefore, the external PC 14 of the present disclosure can efficiently shape the shaped object 20 by the 3D printer 16.

(2) The external PC 14 of the present embodiment may select shaping data that allows the layout portion 64 to narrow the margin region 72, and combine plurality of shaping data to generate combined shaping data. According to the present configuration, the 3D printer 16 can efficiently shape the shaped object 20.

(3) The external PC 14 of the present embodiment may determine the disposition of the shaped object 20 in which the layout portion 64 is indicated by the combined shaping data based on a predetermined condition. According to this configuration, shaping that meets the conditions corresponding to the user's request can be performed.

(4) The external PC 14 of the present embodiment may have the predetermined condition as at least one of a shaping order of the shaped object 20, a shaping time, and a support material used for the shaping of the shaped object 20. According to this configuration, shaping that meets the conditions corresponding to the user's request can be performed.

(5) The external PC 14 of the present embodiment may set the shaping mode to be set to the combined shaping data to a mode set to predetermined shaping data among a plurality of shaping data to be combined. According to the present configuration, the shaping mode of the shaped object 20 indicated by the combined shaping data is unified, whereby the 3D printer 16 can efficiently shape the shaped object 20.

(6) In the external PC 14 of the present embodiment, the layout portion 64 may divide the shaping data into a plurality of pieces, select the shaping data to fill the margin region 72 including the shaping data divided into a plurality of pieces, and combine the plurality of shaping data to generate combined shaping data. According to the present configuration, the 3D printer 16 can efficiently shape the shaped object 20.

(7) In the external PC 14 of the present embodiment, the layout portion 64 may select the shaping data to fill the margin region 72 including the shaping data that has been transmitted to the 3D printer 16 but has not yet been shaped, and combine a plurality of shaping data to generate the combined shaping data. According to the present configuration, the 3D printer 16 can efficiently shape the shaped object 20.

(8) A shaping data combining method of the present embodiment is a shaping data combining method for the external PC 14 to which 3D data indicating a shaped object 20 shaped by the 3D printer 16 is input for each 3D job, and includes a first step of generating shaping data based on the 3D job, a second step of combining a plurality of shaping data to generate combined shaping data to fill the margin region 72 where the shaping of the shaped object 20 is not performed with respect to the shapeable region 70 of the 3D printer 16, and a third step of transmitting the combined shaping data to the 3D printer 16.

(9) A shaping data combining program of the present embodiment causes a main control portion 40 of an external PC 14 to which 3D data indicating a shaped object 20 shaped by the 3D printer 16 is input for each 3D job to function as a 3D shaping data generator 62 that generates the shaping data based on the 3D job, a layout portion 64 that combines a plurality of shaping data to generate combined shaping data to fill the margin region 72 where the shaping of the shaped object 20 is not performed with respect to the shapeable region 70 of the 3D printer 16, and a communication portion 50 that transmits the combined shaping data to the 3D printer 16.

INDUSTRIAL APPLICABILITY

The present disclosure is useful as an information processing device such as a shaping device that shapes a stereoscopic shaped object.

What is claimed is:

1. An information processing device for a shaping device, to which a three-dimensional data indicating a shaped object to be shaped by the shaping device is input for each job, the information processing device comprising:
a processor, configured to:
generate a three-dimensional (3D) shaping data based on the each job;
combine a plurality of the 3D shaping data to generate a combined shaping data for showing a layout of the shaped object, so as to fill a margin region where a shaping of the shaped object is not performed with respect to a shapeable region of the shaping device; and
transmit the combined shaping data to the shaping device,
wherein a disposition of the shaped object in a 3D space indicated by the combined shaping data is determined based on a predetermined condition;
wherein the 3D shaping data includes a support material shaping data for forming a support layer that supports the shaped object by surrounding an outer periphery of the shaped object to be shaped, and the support layer is removed after a completion of the shaping;
wherein the processor is further configured to:
calculate a size of the margin region and a size of the shapeable region based on the 3D shaping data in which the layout is determined;
determine whether the size of margin region being greater than or equal to a predetermined value with respect to the shapeable region;
combine the plurality of the 3D shaping data to generate the combined shaping data in response to that the size of margin region is greater than or equal to the predetermined value with respect to the shapeable region, wherein the combined shaping data is generated to fill the margin region, and "fill the margin region" refers to combining shaping regions of other 3D shaping data so that the margin region of a previous 3D shaping data dispositioned in the shapeable region becomes smaller, and the sum of the shaping region of the previous 3D shaping data and the shaping region of the other 3D shaping data does not exceed 100% of the shapeable region;
derive a plurality of assumed layouts in which the layout is contained, and calculate an amount of the support material for each of the assumed layouts in which an amount of the support material for the layout is calculated;
present the layout having a smallest amount of the support material for forming the support layer among the plurality of assumed layouts; and
select the layout.

2. The information processing device for the shaping device according to claim 1, wherein
the processor is configured to select the 3D shaping data capable of narrowing the margin region, and combine the plurality of 3D shaping data to generate the combined shaping data.

3. The information processing device for the shaping device according to claim 1, wherein
the predetermined condition is at least one of a shaping order of the shaped object, a shaping time, and an amount of a support material used for shaping of the shaped object.

4. The information processing device for the shaping device according to claim 1, wherein
a shaping mode set to the combined shaping data is a mode set to the 3D shaping data that is predetermined among the plurality of 3D shaping data to be combined.

5. The information processing device for the shaping device according to claim 1, wherein
the processor is configured to divide the 3D shaping data into a plurality of pieces of divided shaping data, select the 3D shaping data to fill the margin region including the plurality of pieces of divided shaping data, and combine the plurality pieces of divided shaping data to generate the combined shaping data.

6. The information processing device for the shaping device according to claim 1, wherein
the processor is configured to select the 3D shaping data to fill the margin region including the 3D shaping data that has been transmitted to the shaping device but has not yet been shaped, and combine the plurality of 3D shaping data to generate the combined shaping data.

7. A shaping data combining method for an information processing device for a shaping device, to which a three-dimensional data indicating a shaped object to be shaped by the shaping device is input for each job, the shaping data combining method comprising:
a first step of generating a three-dimensional (3D) shaping data based on the each job;
a second step of combining a plurality of the 3D shaping data to generate a combined shaping data for showing a layout of the shaped object, so as to fill a margin region where a shaping of the shaped object is not performed with respect to a shapeable region of the shaping device; and
a third step of transmitting the combined shaping data to the shaping device,
wherein a disposition of the shaped object in a 3D space indicated by the combined shaping data is determined based on a predetermined condition;
wherein the 3D shaping data includes a support material shaping data for forming a support layer that supports the shaped object by surrounding an outer periphery of the shaped object to be shaped, and the support layer is removed after a completion of the shaping;
wherein the shaping data combining method further:
calculates a size of the margin region and a size of the shapeable region based on the 3D shaping data in which the layout is determined;
determines whether the size of margin region being greater than or equal to a predetermined value with respect to the shapeable region;
combines the plurality of the 3D shaping data to generate the combined shaping data in response to that the size of margin region is greater than or equal to the predetermined value with respect to the shapeable region, wherein the combined shaping data is generated to fill the margin region, and "fill the margin region" refers to combining shaping regions of other 3D shaping data so that the margin region of a previous 3D shaping data dispositioned in the shapeable region becomes smaller, and the sum of the shaping region of the previous 3D shaping data and the shaping region of the other 3D shaping data does not exceed 100% of the shapeable region;
derive a plurality of assumed layouts in which the layout is contained, and calculate an amount of the support material for each of the assumed layouts in which an amount of the support material for the layout is calculated;
present the layout having a smallest amount of the support material for forming the support layer among the plurality of assumed layouts; and
select the layout.

8. A non-transitory computer readable medium stored with a shaping data combining program for causing a computer included in an information processing device for a shaping device, to which a three-dimensional data indicating a shaped object to be shaped by the shaping device is input for each job to function as:
a processor, configured to:
generate a three-dimensional (3D) shaping data based on the each job;
combine a plurality of the 3D shaping data to generate a combined shaping data for showing a layout of the shaped object, so as to fill a margin region where a shaping of the shaped object is not performed with respect to a shapeable region of the shaping device; and
transmit the combined shaping data to the shaping device, wherein a disposition of the shaped object in a 3D space indicated by the combined shaping data is determined based on a predetermined condition;
wherein the 3D shaping data includes a support material shaping data for forming a support layer that supports the shaped object by surrounding an outer periphery of the shaped object to be shaped, and the support layer is removed after a completion of the shaping;
wherein the processor is further configured to:
calculate a size of the margin region and a size of the shapeable region based on the 3D shaping data in which the layout is determined;
determine whether the size of margin region being greater than or equal to a predetermined value with respect to the shapeable region;
combine the plurality of the 3D shaping data to generate the combined shaping data in response to that the size of margin region is greater than or equal to the predetermined value with respect to the shapeable region, wherein the combined shaping data is generated to fill the margin region, and "fill the margin region" refers to combining shaping regions of other 3D shaping data so that the margin region of a previous 3D shaping data dispositioned in the shapeable region becomes smaller, and the sum of the shaping region of the previous 3D shaping data and the shaping region of the other 3D shaping data does not exceed 100% of the shapeable region;
derive a plurality of assumed layouts in which the layout is contained, and calculate an amount of the support material for each of the assumed layouts in which an amount of the support material for the layout is calculated;
present the layout having a smallest amount of the support material for forming the support layer among the plurality of assumed layouts; and
select the layout.

* * * * *